No. 690,259. Patented Dec. 31, 1901.
R. B. FICKENWIRTH.
COUPLING FOR RAILROAD CARS.
(Application filed May 20, 1901.)
(No Model.)

Witnesses
S. F. Brashears
W. C. Syddanes

Inventor
R. B. Fickenwirth
By G. Dittmar.
Attorney

UNITED STATES PATENT OFFICE.

ROBERT BERNHARDT FICKENWIRTH, OF LENGENFELD, GERMANY.

COUPLING FOR RAILROAD-CARS.

SPECIFICATION forming part of Letters Patent No. 690,259, dated December 31, 1901.

Application filed May 20, 1901. Serial No. 61,127. (No model.)

*To all whom it may concern:*

Be it known that I, ROBERT BERNHARDT FICKENWIRTH, a subject of the Emperor of Germany, residing at Lengenfeld, Saxony, Germany, have invented certain new and useful Improvements in Couplings for Railroad-Cars; and I do hereby declare the following to be a full, clear, and exact description of the invention, such as will enable others skilled in the art to which it appertains to make and use the same.

The object of the present invention is an improvement in couplings for railroad-cars.

The coupling of two vehicles by means of the pin-coupling now in use necessitates an employee of the railroad to step into the space between the buffers, exposing himself to great danger. To obviate this inconvenience, many constructions have been proposed for manipulating the coupling device from outside—that is, from the outer longitudinal side of the vehicles. None of the constructions created to this end answer the requisites in such a way so as to be practical on application.

My new coupling is represented in the accompanying drawings, in which—

Figure 3:
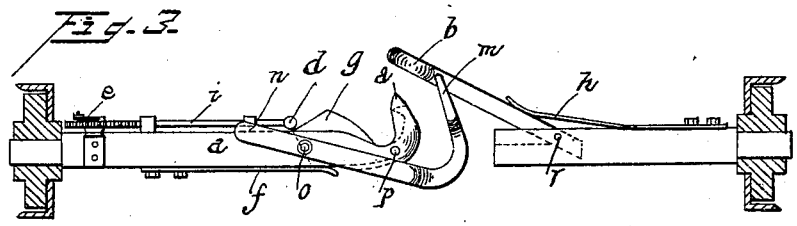
Figure 1:
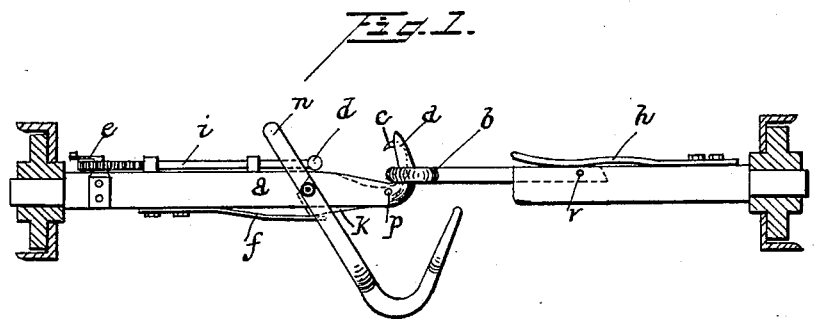
Figure 2:
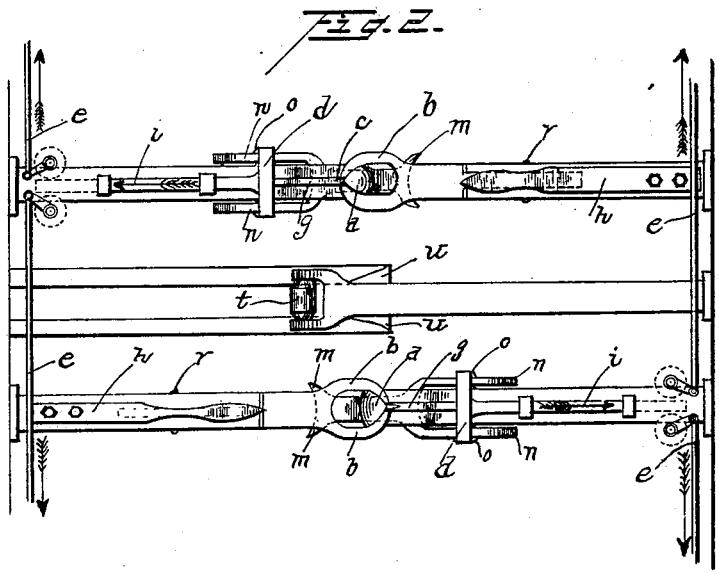

Figure 1 shows the same in side elevation in closed position. Fig. 2 is plan view of the same, and Fig. 3 is a side elevation in open position.

A hook $a$ and a loop $b$ are connected to the railroad-car in the same manner as the parts of the known pin-coupler. The loop $b$ is pivoted at $r$ and is under the action of a leaf-spring $h$, tending to press the loop down into horizontal position. By pushing two cars together the loop $b$ slides upward on the inclined outer surface of the hook $a$ and falls behind the same, thus coupling both cars. An accidental disconnection of the loop and the hook is prevented by a supplemental hook $c$, placed in a corresponding cavity of the hook $a$. Said hook $c$ is pivoted at $p$, and an arm $k$, forming part of said hook, is pressed home by a leaf-spring $f$ when said arm is made free, and then the hook $c$ recedes into its cavity in hook $a$.

Bars $e$ are attached at the end of each car to cranks of cog-wheels or pinions meshing into the teeth of a rack-bar $i$, which is suitably guided upon the stem of the hook $a$ and which is provided with a cross-head $d$. This cross-head in closed position rests upon the arm $k$ of the hook $c$ and prevents it from receding, so that the loop $b$ cannot slip off accidentally from the hook $a$.

When it is desired to disengage two cars, any one of the bars $e$ is drawn out, which turns the respective crank and moves the rack $i$ in the direction of the arrow, Fig. 2. Thus the cross-bar $d$ sets the arm $k$ of hook $c$ free, and its spring $f$ turns the hook $c$ back into its recess, as shown in dotted lines in Fig. 3. At the same time the cross-bar $d$ acts upon the rear arms of two hook-shaped levers $m$, pivoted at $o$. The levers $m$, having their ends united to a bifurcated head, engage the loop $b$ and lift it out of the hook $a$, as shown in Fig. 3.

The height of the coupling differs on the different railroad-lines, and in order to permit two cars of different lines to be coupled I have provided the couplings with arms $u$, as shown in Fig. 2, one having a beveled face, upon which a roller $t$ on the other arm rides up when two cars are brought together, and thereby brings the respective couplings into the proper level.

I claim—

A coupling for railroad-cars comprising a hinged loop on one car, a coupling-hook on the other car having a longitudinal recess in its stem, a spring-actuated supplementary hook pivoted in said recess, a lever pivoted to the hook for lifting the loop, a longitudinal bar in the coupling-hook recess, and means operable from the side of the car for causing the longitudinal bar to press the supplementary hook out of its operative position and to actuate the lever to lift the loop off the coupling-hook, substantially as described.

In testimony whereof I affix my signature in presence of two witnesses.

ROBERT BERNHARDT FICKENWIRTH.

Witnesses:
M. L. SAWTER,
K. HAMMER.